United States Patent
Lin

(10) Patent No.: US 9,146,686 B2
(45) Date of Patent: Sep. 29, 2015

(54) EXTERNAL STORAGE DEVICE AND DATA STORING METHOD FOR THE EXTERNAL STORAGE DEVICE

(71) Applicant: Shang-Jyh Lin, New Taipei (TW)

(72) Inventor: Shang-Jyh Lin, New Taipei (TW)

(73) Assignee: MOXA INC., New Taipei (TW)

( * ) Notice: Subject to any disclaimer, the term of this patent is extended or adjusted under 35 U.S.C. 154(b) by 28 days.

(21) Appl. No.: 14/103,862

(22) Filed: Dec. 12, 2013

(65) Prior Publication Data

US 2015/0169234 A1    Jun. 18, 2015

(51) Int. Cl.
*G11B 21/02*     (2006.01)
*G06F 3/06*      (2006.01)

(52) U.S. Cl.
CPC .............. *G06F 3/0617* (2013.01); *G06F 3/068* (2013.01); *G06F 3/0653* (2013.01); *G06F 3/0659* (2013.01)

(58) Field of Classification Search
None
See application file for complete search history.

(56) References Cited

U.S. PATENT DOCUMENTS

| | | | | |
|---|---|---|---|---|
| 7,142,385 | B2 * | 11/2006 | Shimotono et al. | 360/60 |
| 8,271,692 | B1 * | 9/2012 | Dinh et al. | 710/5 |
| 8,612,798 | B1 * | 12/2013 | Tsai | 714/6.13 |
| 8,706,914 | B2 * | 4/2014 | Duchesneau | 709/250 |
| 8,862,689 | B2 * | 10/2014 | Joukov | 709/217 |
| 8,959,281 | B1 * | 2/2015 | Malina et al. | 711/103 |

* cited by examiner

*Primary Examiner* — K. Wong
(74) *Attorney, Agent, or Firm* — Chih Feng Yeh; Huntington IP Consulting Co., Ltd.

(57) ABSTRACT

The present invention has the differences in that the external storage device has at least a hard disk drive and at least a nonvolatile memory logically integrated into a storage media through a low level of a system associated with the external storage device, measures the environmental temperature and measures continuously and records if a vibration is generated according to a time period, and selectively stores the data into the hard disk drive or the nonvolatile memory. By means of the above technique, the present invention may provide the efficacy of exemption of effects from unceasing vibrations and unstable operational temperature of the hard disk drive under a mobile environment.

6 Claims, 5 Drawing Sheets

EXTERNAL STORAGE DEVICE AND DATA STORING METHOD FOR THE EXTERNAL STORAGE DEVICE

BACKGROUND OF THE RELATED ART

1. Technical Field

The present invention is related to an external storage device and a data storing method for the external storage device, and particularly to an external storage device and a data storing method for the external storage device where a hard disk drive (HDD) and a non-volatile memory are logically integrated as a storage media through driving of a low level of a system associated therewith to provide a mean for an external operating system to view the external storage device as a single storage media.

2. Related Art

Generally, a storage media for a huge capacity storage takes a form of a hard disk drive (HDD). However, such hard disk drive has its limitation in vibration and operational temperature. When a vibration is encountered in a data read/write course, a bad case is a sector violation and thus causing data lost; worse yet, a read/write head is impaired causing the entire hard disk drive unworkable. In addition, when the hard disk drive has its temperature beyond a normal work range, data therein may be lost and an element therein may become failed, leading to an abnormal operation.

In view of this, a nonvolatile memory has been proposed to soothe the limitations in vibration and operational temperature to the hard disk drive. However, such nonvolatile memory has its limitation in storage capacity, i.e. a fixed capacity is inherent with such memory. In a comparative sense, the nonvolatile memory has a cost much higher than the hard disk drive, and thus it is not suitable to be used for huge data amount storage.

Under a mobile environment, the nonvolatile memory does not have a priority in consideration with a huge data capacity storage, the hard disk drive is still necessary. However, how to overcome the situation during a movement course of the hard disk drive where unceasing vibrations and unstable temperature issues are always risen is quite needed.

In view of the above, it may be known the issues of the unceasing vibrations and unstable operational temperature associated with the hard disk drive under a mobile environment have been long presented, which requires some improvement with some technique to overcome.

SUMMARY

In view of the issues of the unceasing vibrations and unstable operational temperature associated with the hard disk drive under a mobile environment, the present invention discloses an external storage device and a method for data storing method for the external storage device.

The external storage device according to the present invention comprises at least a hard disk drive (HDD); at least a nonvolatile memory; a measuring module, having a temperature sensor and a three-axis gravity sensor, measuring an environmental temperature through the temperature sensor, recording a vibration generated according to if a speed or a displacement detected by the three-axis gravity sensor are larger than or equal to a preset value, respectively, and recording continuously if the vibration is generated with time; a request module, receiving a data storing request from an external operating system; a determination module, determining if the environmental temperature is larger than or equal to a preset temperature, respectively, when the request module receives the data storing request, and determining if a number of the generated vibration within a preset time period is larger than 0; and an integration and storing module, logically integrating the hard disk drive and the nonvolatile memory into a single storage media through a low level driver, and storing a data corresponding to the data storing request selectively to one of the hard disk drive and the nonvolatile memory according to a determination result of the temperature and vibration.

The method for storing a data for an external storage device according to the present invention comprises steps of providing the external storage device having at least a hard disk drive (HDD) and at least a nonvolatile memory, the external storage device logically integrating the hard disk drive and the nonvolatile memory into a single storage media through a low level driver. Next, the external storage device measures an environmental temperature through the temperature sensor, records a vibration generated according to if a speed or a displacement detected by a three-axis gravity sensor are larger than or equal to a preset value, respectively, and records continuously if the vibration is generated with time. Then, the external storage device receives a data storing request from an external operating system; the external storage device determines if the environmental temperature is larger than or equal to a preset temperature, respectively, upon receiving the data storing request, and determines if a number of the generated vibration within a preset time period is larger than 0. Finally, the external storage device stores the data selectively into one of the hard disk drive and the nonvolatile memory according to a determination result of the temperature and vibration.

The present invention has the differences in that the external storage device has at least a hard disk drive and at least a nonvolatile memory logically integrated into a storage media through a low level of a system associated with the external storage device, measures the environmental temperature and measures continuously and records if a vibration is generated according to a time period, and selectively stores the data into the hard disk drive or the nonvolatile memory.

By means of the above technique, the present invention may provide the efficacy of exemption of effects from unceasing vibrations and unstable operational temperature of the hard disk drive under a mobile environment.

BRIEF DESCRIPTION OF THE DRAWINGS

The present invention will become more fully understood from the detailed description given herein below illustration only, and thus is not limitative of the present invention, and wherein.

DETAILED DESCRIPTION

The present invention will be apparent from the following detailed description, which proceeds with reference to the accompanying drawings, wherein the same references relate to the same elements. With reference to the detailed description, those skilled in the art may use the technical skill to solve the associated problem and thus achieve in the technical efficacy associated therewith, namely, may be enabled to implement the present invention.

Figure 1:
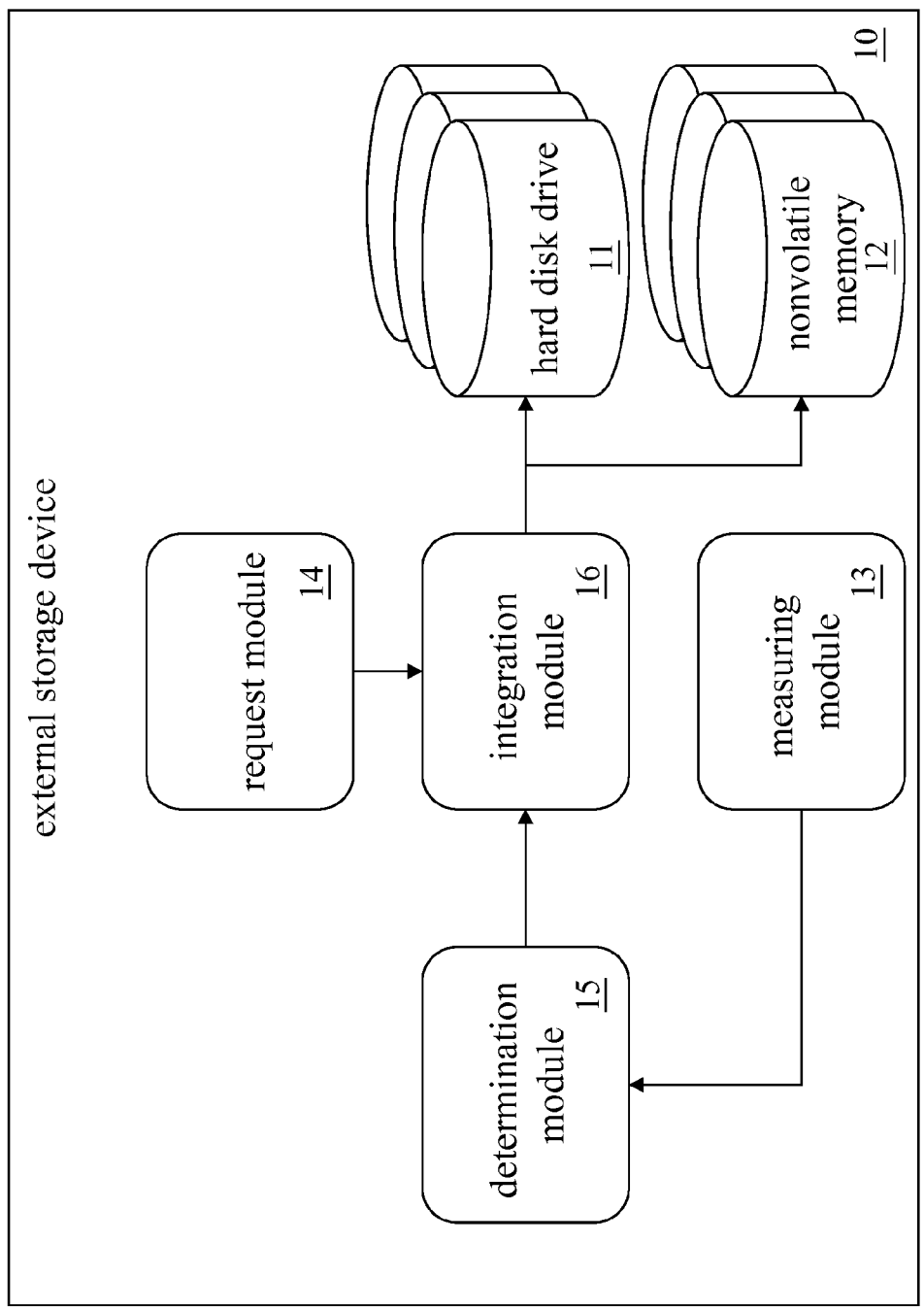
FIG. 1 is a schematic block diagram of an external storage device of the present invention.
Figure 2A:
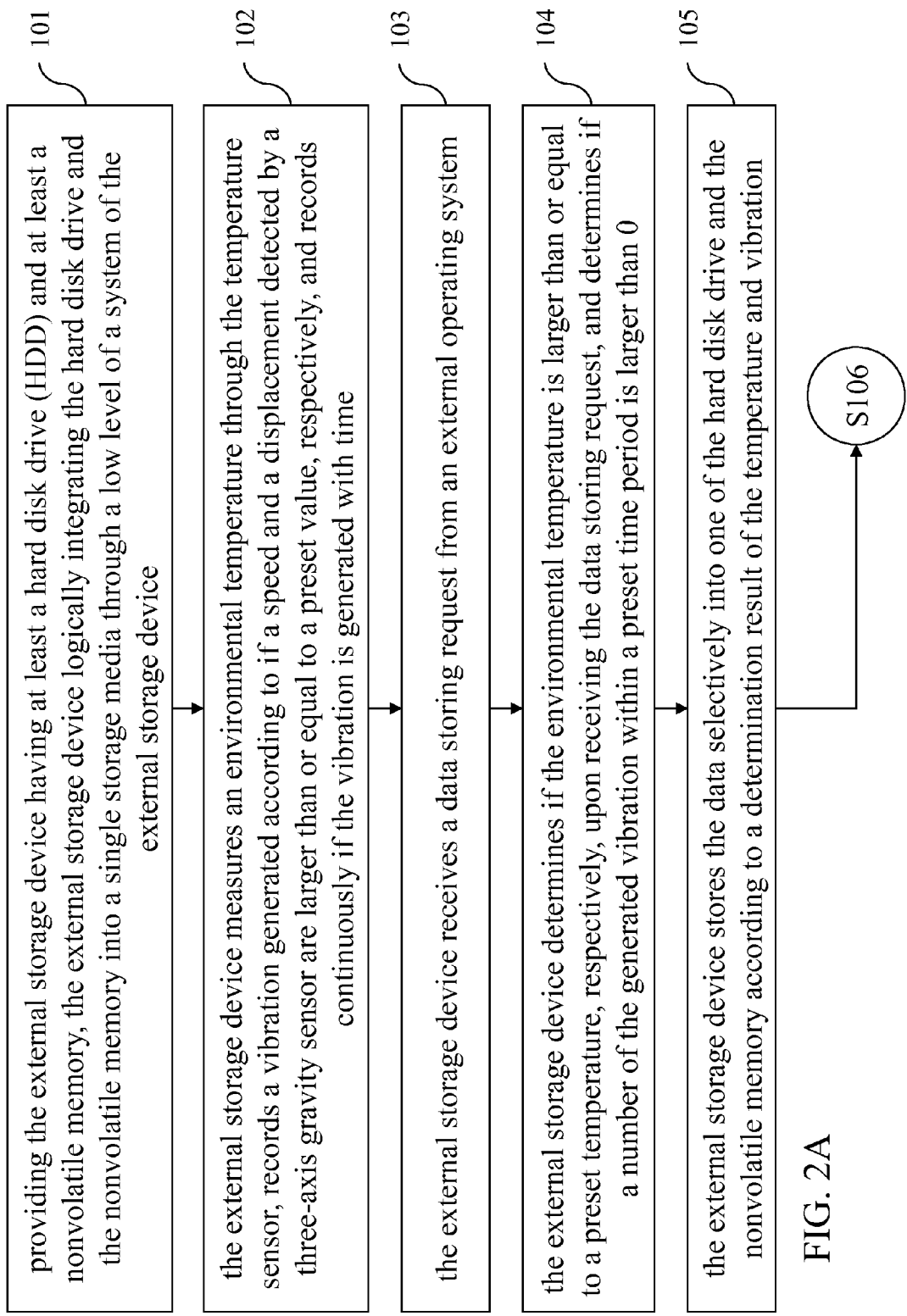
FIG. 2A and FIG. 2B are a flowchart diagram of a method for storing data for the external storage device according to the present invention.
Figure 2B:
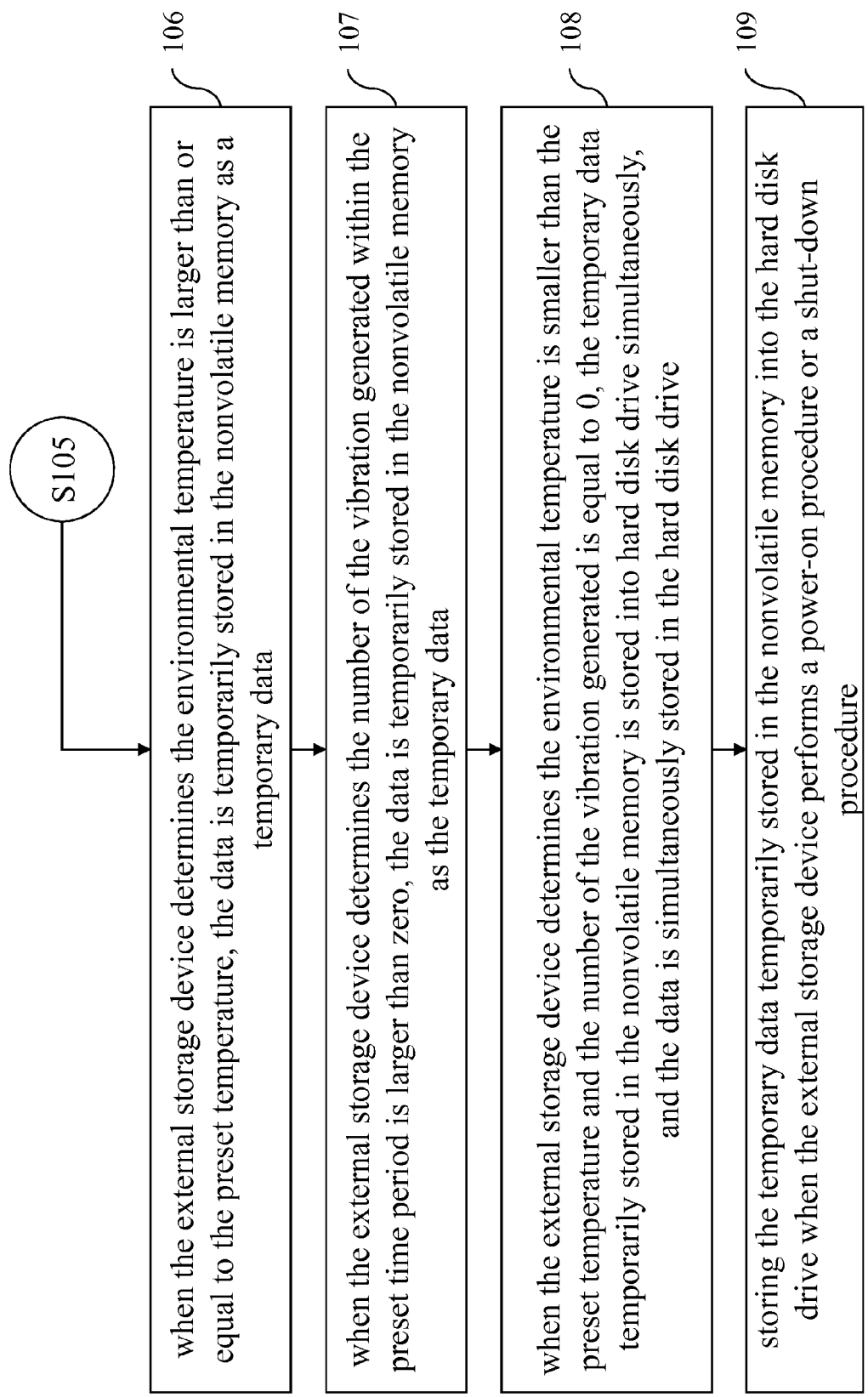

In the following, it first comes with description for an external storage device according to the present invention, with reference to FIG. 1, FIG. 2A and FIG. 2B. FIG. 1 is a schematic block diagram of the external storage device of the present invention. FIG. 2A and FIG. 2B are a flowchart diagram of a method for storing data for the external storage device according to the present invention.

The external storage device 10 comprises at least a hard disk drive (HDD) 11, at least a nonvolatile memory 12, a measuring module 13, a request module 14, a determination module 15 and an integration and storing module 16.

The hard disk drive 11 is a nonvolatile storage device based on a hard rotating disk used with a computer, which stores and searches digital data on a flat magnetic surface. Information may be written onto the magnetic disk through a magnetic head very close to the magnetic surface which alters its? polarity by using an electromagnetic flow. In reading information from the magnetic disk, a reverse process with respect to the information writing process is performed. For example, a magnetic field results in an alternation of the electric force on the coil or the read head runs over the hard disk. The read/write action of the hard disk is conducted in a random access fashion, and thus reading the information on the hard disk may be done by any sequence.

The nonvolatile memory (NVRAM) 12 is a computer memory in which the stored information may be maintained even when a power supply is shut down. In terms of if such memory may be rewritten in an operating process, the nonvolatile memory may be categorized into two types: read-only memory (ROM) and flash memory. Herein, the nonvolatile memory 12 is particularly the flash memory, of which a NAND flash memory is the most common one. The NAND flash memory is also the main memory adopted by a solid state disk (SSD). Namely, the nonvolatile memory 12 may be such solid state disk, but which is merely an example without limiting the present invention.

The integration and storing module 16 uses a device mapper provided by a Linux kernel to logically integrate the hard disk drive 11 and the nonvolatile memory 12 into a single storage media (S101), whereby an external operating system may view the external storage device 10 as a storage media when connected to the external storage device 10. But, in fact, the external storage device 10 is a multiple storage media including at least one of the hard disk drive 11 and at least one of the nonvolatile memory 12.

Figure 3:
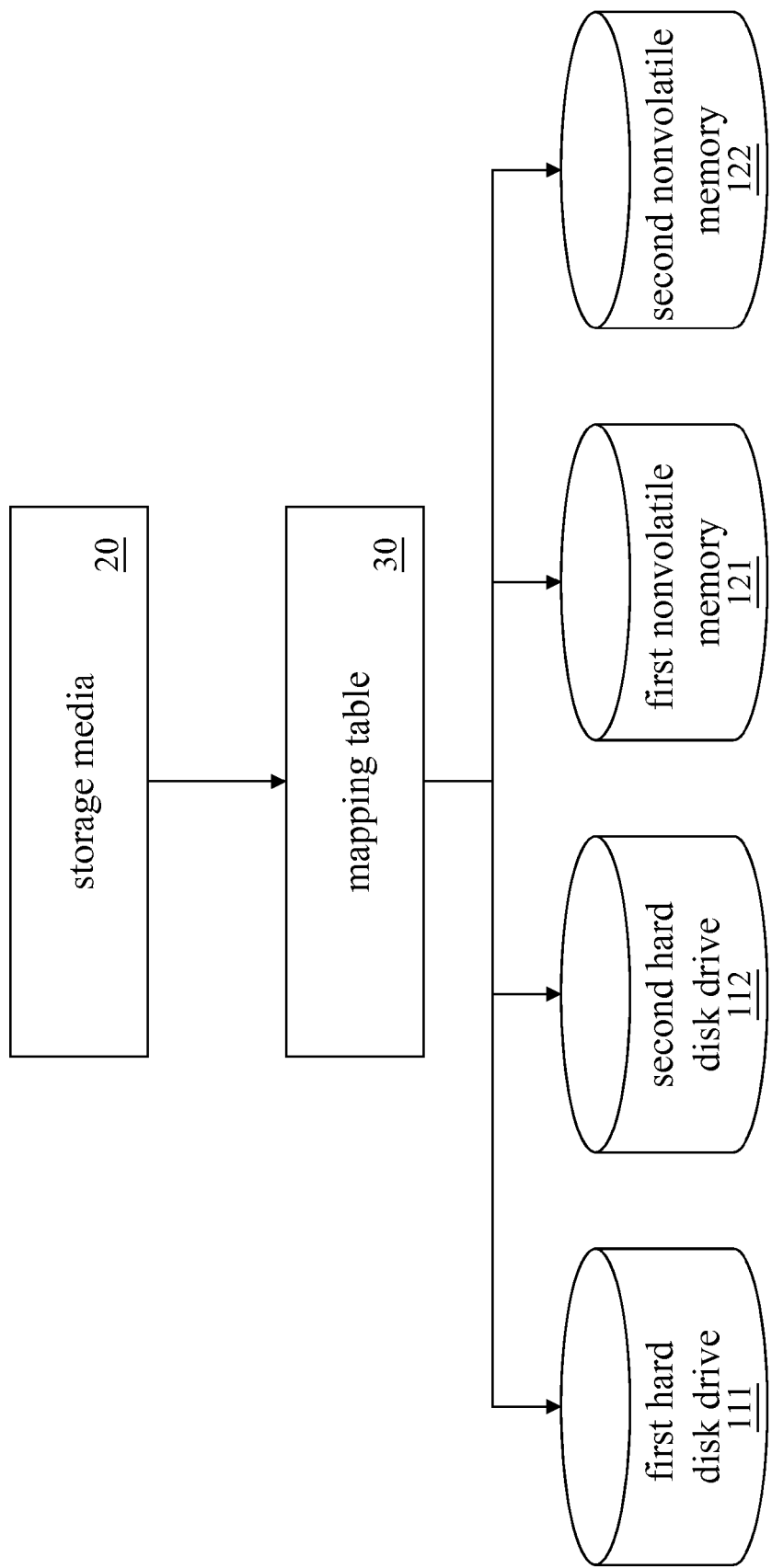
FIG. 3 is a schematic diagram illustrating a mapping relationship among a storage media, a hard disk drive and a nonvolatile memory of the external storage device according to the present invention.

Now, referring to FIG. 1, FIG. 2A FIG. 2B and FIG. 3 concurrently, in which FIG. 3 is a schematic diagram illustrating a mapping relationship among a storage media, a hard disk drive and a nonvolatile memory of the external storage device according to the present invention.

Assume the external storage device 10 includes a first hard disk drive 111, a second hard disk 112, a first nonvolatile memory 121 and a second nonvolatile memory 122. First, in the Linux kernel, a storage media 20 is established and registered, which is namely a mapping device defined in the device mapper in the Linux kernel.

Thereafter, assume a first sector to an N-th sector of the storage media 20 and a sector of the first hard disk drive 112 map to each other, an N+1-th sector of the storage media 20 to an 2N-th sector and a sector of the second hard disk drive 112 map to each other, a 2N+1-th sector to a 3N-th of the storage media 20 and a memory block of the first nonvolatile memory 121 map to each other, and a 3N+1 sector to a 4N-th sector of the storage media 20 and a memory block of the second nonvolatile memory 122 map to each other. A mapping table between the storage media 20 and the first hard disk drive 111, second hard disk drive 112, first nonvolatile memory 121 and second nonvolatile memory 122, may be established, respectively.

The mentioned first hard disk drive 111, second hard disk drive 112, first nonvolatile memory 121 and second nonvolatile memory 122 are each so-called "target device" defined in device mapper in Linux kernel.

Namely, when the external operating system intends to store data into the first sector to the storage media 20, the data is exactly stored in the first hard disk drive 111. As another example, when the external operating system intends to store data into the 3N+5-th sector of the storage media 20, the data is exactly stored in the second nonvolatile memory 122.

It is also to be noted that since the implementation is based on Linux kernel principles, the above described operating technique may be individually operated on a RISC or X86 hardware architecture without the need of depending upon any file system.

Referring to FIG. 1, FIG. 2A and FIG. 2B, the measuring module 13 measures the environmental temperature through a temperature sensor. The measuring module 13 further records a vibration generated according to if a speed and a displacement detected by a three-axis gravity sensor are larger than or equal to a preset value, respectively, and records continuously if the vibration is generated with time (S102).

For example, assume now a temperature "50° C." is measured by the temperature sensor, the measuring module 13 shows its measured temperature as "50° C.". Assume the external environment has continuous vibrations, the speed or displacement measured by the three-axis gravity sensor may be continuously larger than or equal to the preset value. The measuring module 13 may record the vibration for each second. Assume the external environment only generates an individual vibration, the speed or displacement measured by the three-axis gravity sensor may be only larger than or equal to the preset value at a particular time point, namely, the measuring module 13 may record the generated vibration at the particular time point.

Subsequently, after the request module 14 receives data storing request from the external operating system (S103), the determination module 15 determines if the environmental temperature is larger than or equal to the preset temperature and if a total number of the vibration within a preset time period is larger than zero (S104).

At this time, the integration and storing module 16 may selectively store the data into the hard disk drive 11 or the nonvolatile memory 12 according to the determination result with regard to temperature and vibration by the determination module 15 (S105), i.e. the data is stored into some specific sector in the storage media to map to the hard disk drive 11 or nonvolatile memory 12, so that the data may be selectively into the hard disk drive 11 or nonvolatile memory 12.

The integration and storing module 16 stores the data selectively into the hard disk drive 11 or nonvolatile memory 12 according to the following principles.

When the determination module 15 determines the environmental temperature is larger than or equal to the preset temperature, the data is temporarily stored in the nonvolatile memory 12 as a temporary data (S106).

For example, assume the environmental temperature measured by the measuring module 13 is "70° C." and assume the preset temperature is "60° C.". At this time, the request module 14 receives from the external operating system the data storing request, the determination module 15 may determine the environmental temperature is "70° C." which is larger than the preset temperature "60° C.". On the other hand, the integration and storing module 16 stores the data in a sector of the storage media and the sector is mapped to the nonvolatile memory 12, whereby storing the data temporarily in the nonvolatile memory 12 as the temporary data.

When the determination module 15 determines the number of the vibration generated within the preset time period is larger than zero, the data is temporarily stored in the nonvolatile memory 12 as a temporary data (S107).

For example, assume the measuring module 13 lasts 30 seconds for measurement and records the generated vibration, and assume the preset time period is "10 seconds". At this time, the request module 14 receives from the external operating system the data storing request, the determination module 15 may determine the total number of vibrations happening within the preset time period "10 seconds". On the other hand, the integration and storing module 16 stores the data in a sector in the storage media and the sector is mapped to the nonvolatile memory 12, whereby temporarily storing the data in the nonvolatile memory 12 as the temporary data.

When the determination module 15 determines the environmental temperature is smaller than the preset temperature and the number of the vibrations generated within the preset time period is equal to 0, the integration and storing module 16 stores the temporary data in the storage media and a sector mapped by the hard disk drive 11, and the data in the storage media and a sector mapped by the hard disk drive 11, so that the temporary data and the data are stored in the hard disk drive 11. As such, the temporary data temporarily stored in the nonvolatile memory 12 is stored into hard disk drive 11 simultaneously, and the data is simultaneously stored in the hard disk drive 11 (S108).

For example, assume the environmental temperature measured by the measuring module 13 is "50° C.", and assume the preset temperature is "60° C.". Assume the measuring module 13 has no measurement and records the generated vibrations. And, the preset time is assumed as "10 seconds". At this time, the request module 14 receives from the external operating system the data storing request, the determination module 15 may determine the environmental temperature as "50° C.", which is smaller than the preset temperature "60° C.". And the total number of vibrations within the preset time "10 seconds" is "0". At this time, the integration and storing module 16 stores the temporary data in the storage media and a sector mapped by the hard disk drive 11, and stores the data into the storage media and a sector mapped by the hard disk drive 11, whereby storing the temporary data and the data into the hard disk drive 11. As such, the temporary data temporarily stored in the nonvolatile memory 12 may be temporarily stored in the hard disk drive 11 simultaneously and the stored data may be stored in the hard disk drive 11.

Furthermore, the design and implementation where the integration and storing module 16 logically integrates the hard disk drive 11 and the nonvolatile memory 13 into the single storage media through the low level driver by using the device mapper of the Linux kernel, and the determination result of the temperature and vibrations according to the determination module 15 by the integration and storing module 16 by which the data may be selectively stored into the hard disk drive 11 or the nonvolatile memory 12, may enable the data to be protected without requiring any additional process from a user and the operational system.

In addition, when the external storage device 10 performs a power-on procedure or a shut-down procedure, the integration and storing module 16 may store the temporary data temporarily stored in the nonvolatile memory 12 into the hard disk drive 11 (S109).

Figure 4:
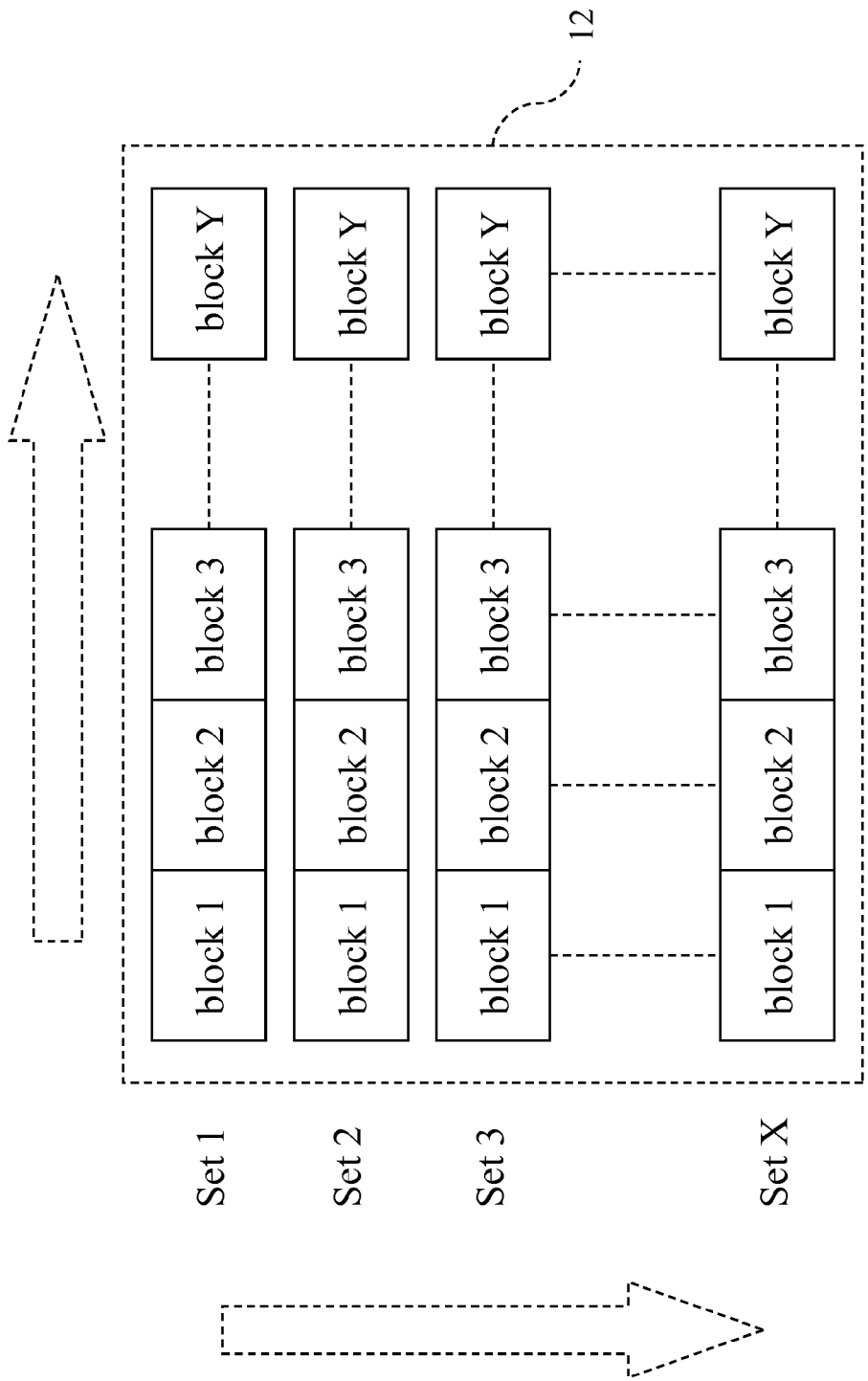
FIG. 4 is a schematic diagram of a hybrid hash algorithm used in the present invention.

It is to be noted that that the integration and storing module 16 temporarily stores the data in the nonvolatile memory 12 as the temporary data by using a hybrid hash algorithm, and the temporary data temporarily stored in the nonvolatile memory 12 in the hard disk drive 11. Referring to FIG. 4, which is a schematic diagram of the hybrid hash algorithm used in the present invention.

Specifically, a two dimensional hash function is used in the nonvolatile memory 12, in which x sets are included each including Y blocks each having a sector size of Z KB, wherein X, Y and Z are all a positive integer. For example, assume the nonvolatile memory 12 has a size of 1 GB and each of such sets of the nonvolatile memory 12 has Y blocks each having a size of 4 KB, then each of such sets has a capacity of Y*4 KB and the nonvolatile memory 12 is divided into 1 GB/Y×4 KB sets. However, this is only an example without limiting the present invention.

All IO requests are processed with the two dimensional hash function, they enter the corresponding sets and store at empty blocks in a linear probing manner. If all the blocks in the set have been full, the linear probing manner is used to look for storage room in a next set at an empty room. For example, the storage room searching job begins from the first block to the Y block in the first set. Assume now the first block to the Y-th block in the first set are all not empty, then look for the storage room from the first block to the Y-th block in the second set. Assume now the first block to the Y-th block in the second set are all not empty, then look for the storage room from the first block to the Y-th block in the third set. The same process lasts till an empty block is located. However, this is only an example without limiting the present invention.

In this manner, the IO requests with sectors close to each other or one another may enter the sets close to each other or one another, so that the data is temporarily stored in the nonvolatile memory 12 as the temporary data, and the temporary data temporarily stored in the nonvolatile memory 12 is stored into the hard disk drive 11. As such, the temporary data is read/written without requiring a considerable movement of the magnetic head of the hard disk drive 11. In this manner, the speed of the temporary data being stored into the nonvolatile memory 12 may be enhanced, i.e. the access efficiency of IO requests may be enhanced. At the same time, the storage room in the nonvolatile memory 12 may be efficiently used.

The present invention has the differences in that the external storage device has at least a hard disk drive and at least a nonvolatile memory logically integrated into a storage media through a low level of a system associated with the external storage device, measures the environmental temperature and measures continuously and records if a vibration is generated according to a time period, and selectively stores the data into the hard disk drive or the nonvolatile memory.

By means of the above technique, the present invention may provide the efficacy of exemption of effects from unceasing vibrations and unstable operational temperature of the hard disk drive under a mobile environment.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An external storage device, comprising:
   at least a hard disk drive (HDD);
   at least a nonvolatile memory;
   a measuring module, having a temperature sensor and a three-axis gravity sensor, measuring an environmental temperature through the temperature sensor, recording a vibration generated according to if a speed or a displacement detected by the three-axis gravity sensor are larger than or equal to a preset value, respectively, and recording continuously if the vibration is generated with time;
   a request module, receiving a data storing request from an external operating system;
   a determination module, determining if the environmental temperature is larger than or equal to a preset temperature, respectively, when the request module receives the data storing request, and determining if a number of the generated vibration within a preset time period is larger than 0; and
   an integration and storing module, logically integrating the hard disk drive and the nonvolatile memory into a single storage media through a low level driver, each of the nonvolatile memory has a plurality of sets and each of set has a plurality of blocks, and storing a data corresponding to the data storing request selectively to one of the hard disk drive and the nonvolatile memory according to a determination result of the temperature and vibration by following process:
      when the determination module determines the environmental temperature is larger than or equal to the preset temperature, the nonvolatile memory is found through using a hybrid hash algorithm by the integration and storing module, and the data is temporarily stored in empty blocks which is found in a linear probing manner of the set which is found of the nonvolatile memory as a temporary data;
      when the determination module determines the number of the vibration generated within the preset time period is larger than zero, the nonvolatile memory is found through using a hybrid hash algorithm by the integration and storing module, and the data is temporarily stored in empty blocks which is found in a linear probing manner of the set which is found of the nonvolatile memory as a temporary data; and
      when the determination module determines the environmental temperature is smaller than the preset temperature and the number of the vibration generated is equal to 0, the temporary data temporarily stored in the nonvolatile memory is stored into hard disk drive simultaneously, and the data is simultaneously stored in the hard disk drive.

2. The external storage device as claimed in claim 1, wherein the integration and storing module logically integrating the hard disk drive and the nonvolatile memory into the single storage media through the low level driver by using a device mapper provided by a Linux kernel, so that the external operating system views the external storage device as a single storage media.

3. The external storage device as claimed in claim 1, wherein the integration and storing module further stores the temporary data temporarily stored in the nonvolatile memory into the hard disk drive when the external storage device performs a power-on procedure or a shut-down procedure.

4. A method for storing a data for an external storage device, comprising:
   providing the external storage device having at least a hard disk drive (HDD) and at least a nonvolatile memory, the external storage device logically integrating the hard disk drive and the nonvolatile memory into a single storage media through a low level driver, each of the nonvolatile memory has a plurality of sets and each of set has a plurality of blocks;
   the external storage device measures an environmental temperature through the temperature sensor, records a vibration generated according to if a speed and a displacement detected by a three-axis gravity sensor are larger than or equal to a preset value, respectively, and records continuously if the vibration is generated with time;
   the external storage device receives a data storing request from an external operating system;
   the external storage device determines if the environmental temperature is larger than or equal to a preset temperature, respectively, upon receiving the data storing request, and determines if a number of the generated vibration within a preset time period is larger than 0; and
   the external storage device stores the data selectively into one of the hard disk drive and the nonvolatile memory according to a determination result of the temperature and vibration by following process:
      when the external storage device determines the environmental temperature is larger than or equal to the preset temperature, the nonvolatile memory is found through using a hybrid hash algorithm by the external storage device, and the data is temporarily stored in empty blocks which is found in a linear probing manner of the set which is found of the nonvolatile memory as a temporary data;
      when the external storage device determines the number of the vibration generated within the preset time period is larger than zero, the nonvolatile memory is found through using a hybrid hash algorithm by the external storage device, and the data is temporarily stored in empty blocks which is found in a linear probing manner of the set which is found of the nonvolatile memory as a temporary data; and
      when the external storage device determines the environmental temperature is smaller than the preset temperature and the number of the vibration generated is equal to 0, the temporary data temporarily stored in the nonvolatile memory is stored into hard disk drive simultaneously, and the data is simultaneously stored in the hard disk drive.

5. The method as claimed in claim 4, wherein the step of logically integrating the hard disk drive and the nonvolatile memory into the single storage media further comprises a step of logically integrating the hard disk drive and the nonvolatile memory into the single storage media through the low level driver by using a device mapper of a Linux kernel, so that the external operating system views the external storage device as a single storage media.

6. The method as claimed in claim 4, further comprising a step of storing the temporary data temporarily stored in the nonvolatile memory into the hard disk drive when the external storage device performs a power-on procedure or a shut-down procedure.

* * * * *